US012810376B2

(12) United States Patent
Jones et al.

(10) Patent No.: US 12,810,376 B2
(45) **Date of Patent: *Nov. 24, 2026**

(54) UNIFIED MEMORY SYSTEMS AND METHODS

(71) Applicant: NVIDIA Corporation, Santa Clara, CA (US)

(72) Inventors: Stephen Jones, San Francisco, CA (US); Vivek Kini, Santa Clara, CA (US); Piotr Jaroszynski, Sunnyvale, CA (US); Mark Hairgrove, San Jose, CA (US); David Fontaine, Mountain View, CA (US); Cameron Buschardt, Midland, TX (US); Lucien Dunning, Ridgewood, NJ (US); John Hubbard, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/823,528

(22) Filed: Sep. 3, 2024

(65) Prior Publication Data

US 2025/0217921 A1 Jul. 3, 2025

Related U.S. Application Data

(63) Continuation of application No. 16/919,954, filed on Jul. 2, 2020, now Pat. No. 12,112,395, which is a (Continued)

(51) Int. Cl.
*G06F 13/14* (2006.01)
*G06F 9/50* (2006.01)
(Continued)

(52) U.S. Cl.
CPC .............. *G06T 1/20* (2013.01); *G06F 9/5016* (2013.01); *G06F 12/109* (2013.01); *G06T 1/60* (2013.01)

(58) Field of Classification Search
CPC .......... G06F 3/14; G06F 9/451; G06F 9/5016; G06F 12/109; G09G 5/363; G09G 5/006;
(Continued)

(56) References Cited

U.S. PATENT DOCUMENTS

| | | | | |
|---|---|---|---|---|
| 2006/0098022 A1* | 5/2006 | Andrews | G06T 15/005 | 345/557 |
| 2010/0118041 A1* | 5/2010 | Chen | G06T 1/60 | 345/542 |

(Continued)

*Primary Examiner* — Gordon G Liu
(74) *Attorney, Agent, or Firm* — Davis Wright Tremaine LLP

(57) ABSTRACT

The present invention facilitates efficient and effective utilization of unified virtual addresses across multiple components. In one exemplary implementation, an address allocation process comprises: establishing space for managed pointers across a plurality of memories, including allocating one of the managed pointers with a first portion of memory associated with a first one of a plurality of processors; and performing a process of automatically managing accesses to the managed pointers across the plurality of processors and corresponding memories. The automated management can include ensuring consistent information associated with the managed pointers is copied from the first portion of memory to a second portion of memory associated with a second one of the plurality of processors based upon initiation of an accesses to the managed pointers from the second one of the plurality of processors.

20 Claims, 6 Drawing Sheets

1400

Related U.S. Application Data continuation of application No. 16/237,010, filed on Dec. 31, 2018, now Pat. No. 10,762,593, which is a continuation-in-part of application No. 15/709,397, filed on Sep. 19, 2017, now Pat. No. 10,546,361, which is a continuation-in-part of application No. 14/601,223, filed on Jan. 20, 2015, now Pat. No. 10,319,060.

(60) Provisional application No. 61/929,913, filed on Jan. 21, 2014, provisional application No. 61/965,089, filed on Jan. 21, 2014, provisional application No. 61/929,496, filed on Jan. 20, 2014.

(51) Int. Cl.

*G06F 12/109* (2016.01)
*G06T 1/20* (2006.01)
*G06T 1/60* (2006.01)

(58) Field of Classification Search

CPC ........... G09G 1/001; G06T 1/20; G06T 11/40; G06T 15/005; G06T 2200/04; G06T 2210/12; G06T 2200/16; G06T 3/40; G06T 1/60; G16H 40/67; G16H 30/20; G16H 30/40; H06T 2200/24; A61B 6/463; A61B 6/465; A61B 6/467; A61B 6/563

USPC .......................................................... 345/520

See application file for complete search history.

(56) References Cited

U.S. PATENT DOCUMENTS

2011/0161619 A1* 6/2011 Kaminski ........... G06F 12/1027 711/E12.016
2012/0188263 A1* 7/2012 Becchi .................. G06F 12/109 345/530
2013/0138840 A1* 5/2013 Kegel ................... G06F 12/109 710/22
2013/0198494 A1 8/2013 Grover et al.
2014/0049551 A1* 2/2014 Rao ........................... G06T 1/20 345/543

* cited by examiner

900

UNIFIED MEMORY SYSTEMS AND METHODS

RELATED APPLICATIONS

This application is a continuation of and claims the benefit of priority to:

U.S. non-provisional application Ser. No. 16/237,010 entitled "Unified Memory Systems and Methods," filed Dec. 31, 2018, which is a continuation of and which claims the benefit of priority to:

U.S. non-provisional application Ser. No. 15/709,397 entitled "Unified Memory Systems and Methods," filed Sep. 19, 2017, now U.S. Pat. No. 10,546,361, which is a continuation-in-part (CIP) of and which claims the benefit of priority to:

U.S. non-provisional application Ser. No. 14/601,223 entitled "Unified Memory Systems and Methods," filed Jan. 20, 2015, now U.S. Pat. No. 10,319,060, which in turn claims the benefit of priority to:

provisional application 61/929,496 entitled "Unified Memory Systems and Methods," filed Jan. 20, 2014;

provisional application 61/965,089 entitled "Unified Memory Systems and Methods," filed Jan. 21, 2014; and provisional application 61/929,913 entitled "Inline Parallelism and Re-targetable Parallel Algorithms," filed Jan. 21, 2014, the disclosures of all of which are incorporated by reference herein in their entirety for all intents and purposes.

FIELD OF THE INVENTION

The present invention relates to the field of memory configuration. In one embodiment, virtual addressing associated with unified memory is implemented with pointer coordination across multiple entities.

BACKGROUND OF THE INVENTION

Electronic systems and devices facilitate increased productivity and reduced costs in analyzing and communicating various types of data. These electronic systems (e.g., digital computers, calculators, audio devices, video equipment, telephone systems, etc.) typically include various components that need access to memory to implement their desired functionality or operations. Conventional attempts at utilizing virtual addresses and pointers across various components of a system are typically complicated and can have undesirable impacts.

Many computing systems often have multiple processors (e.g., a central processing unit (CPU), a graphics processing unit (GPU), etc.) and respective memories with their own respective memory management units (MMUs). This potentially leads to a scenario where there are two distinct address spaces, one that is setup by the OS for the CPU and the other that is setup by the GPU driver for the GPU. These are often distinct virtual address (VA) spaces setup by different software components and can potentially lead to pointer collision or overlap. The various conventional approaches that attempt to handle virtual addresses and pointer tracking typically have a number of problems. Some traditional attempts at resolving these issues are directed at having applications try to explicitly track which VA space a pointer belongs to. Some traditional approaches attempt to reserve a large CPU VA chunk from the OS and have the GPU driver allocate only in this VA range. However, this approach often has a number of drawbacks including possible waste of CPU VA space if a large chunk is reserved initially but the actual amount of space that is required or utilized is much less. In some systems (e.g., on 32 bit CPU, etc.) the VA space can be considered relatively small and reserving large chunks of CPU VA space for the GPU can result in lower system utilization and inadequate VA space remaining available for operations of the other components (e.g., CPU, etc.).

Some programs (e.g., a CUDA program, etc.) often need to maintain two copies of data and need fast access to the data from both the CPU and the GPU.

This traditionally puts a significant burden on a developer or user to maintain and keep two pointers. For example, the user or programmer usually has to take explicit actions to ensure both copies of data associated with the pointers or addresses are consistent. This can become a very complicated and extensive task which increases the workload and effort required by a user and in turn can also increase the barrier to entry for novice users of the programs. These added burdens and difficulties increase the likelihood of programming mistakes that adversely impact system performance (e.g., increased faults, non-coherent data, etc.). Traditional approaches can also make widespread adoption of associated components (e.g., CPUs, GPUs, etc.) harder, because it's more difficult to port existing code written for one processor (e.g., the CPU) over to a heterogeneous system that has multiple processors (e.g., both a CPU and a GPU).

SUMMARY

Presented embodiments facilitate efficient and effective utilization of unified virtual addresses across multiple components. In one embodiment, the presented new approach or solution uses Operating System (OS) allocation on the central processing unit (CPU) combined with graphics processing unit (GPU) driver mappings to provide a unified virtual address (VA) across both GPU and CPU. The new approach helps ensure that a GPU VA pointer does not collide with a CPU pointer provided by OS CPU allocation (e.g., like one returned by "malloc" C runtime API, etc.). In one exemplary implementation, an address allocation process comprises: establishing space for managed pointers across a plurality of memories, including allocating one of the managed pointers with a first portion of memory associated with a first one of a plurality of processors; and performing a process of automatically managing accesses to the managed pointers across the plurality of processors and corresponding memories. The automated management can include ensuring consistent information associated with the managed pointers is copied from the first portion of memory to a second portion of memory associated with a second one of the plurality of processors based upon initiation of an access to the managed pointers from the second one of the plurality of processors.

Establishing space for managed pointers can include reserving a region from the first processor's virtual address space and reserving a region from the second processor's virtual address space, wherein the regions are reserved for allocations of the managed pointers. Data coherency and concurrency across the memories can be automatically maintained. In one embodiment, the managed memory can be part of a unified memory. In one exemplary implementation, the second one of the plurality of processors is a central processing unit (CPU) and the first one of a plurality of processors is a graphics processing unit (GPU). When the CPU attempts to access the pointer, space in the central processing unit physical addresses (CPU PA) is allocated, the portion of the GPU PA is automatically copied to the CPU PA, and the address in the CPU VA is mapped to the allocated CPU PA. The CPU PA is copied to the GPU PA when a kernel utilizing the managed pointers is launched in the GPU.

In one embodiment, a system comprises: a first processor for processing information and a second processor for processing information, wherein accesses associated with a pointer are automatically managed across multiple memories associated with the first processor and the second processor. Accesses associated with the pointer can be automatically managed back and forth between the first processor and the second processor according to which processor is accessing the pointer. In one embodiment, an API managed memory allocation call triggers the automatic management of the pointer and a driver manages the memories associated with the pointer. The pointer can be accessed and used across multiple different processors. Movement or copying of information between processors can be automated and transparent to the user utilizing a single managed pointer without having to be concerned about concurrency or coherency of data between the different processors or memories. The pointer is accessible from multiple entities.

In one embodiment, a tangible computer readable medium includes instructions for directing a processor in the implementation of an address allocation process. The address allocation process comprises: allocating a pointer to a first portion of memory associated with a first processor, wherein the pointer is also utilized by a second processor, and managing accesses to the pointer automatically. Managing the accesses includes making sure appropriate consistent information associated with the pointer is copied to a second portion of physical memory associated with the second processor, wherein the copying is done based on attempts to access the information by the second processor. The copying can be done based on accesses. Allocation of managed memory can include utilization of an API. A device variable can have the same restrictions as a returned allocation. In one exemplary implementation, allocation of managed memory includes utilization of a keyword that can be applied to device variables. There can be support for page faults to a pointer associated with accesses by the second processor.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

DETAILED DESCRIPTION

Figure 1:
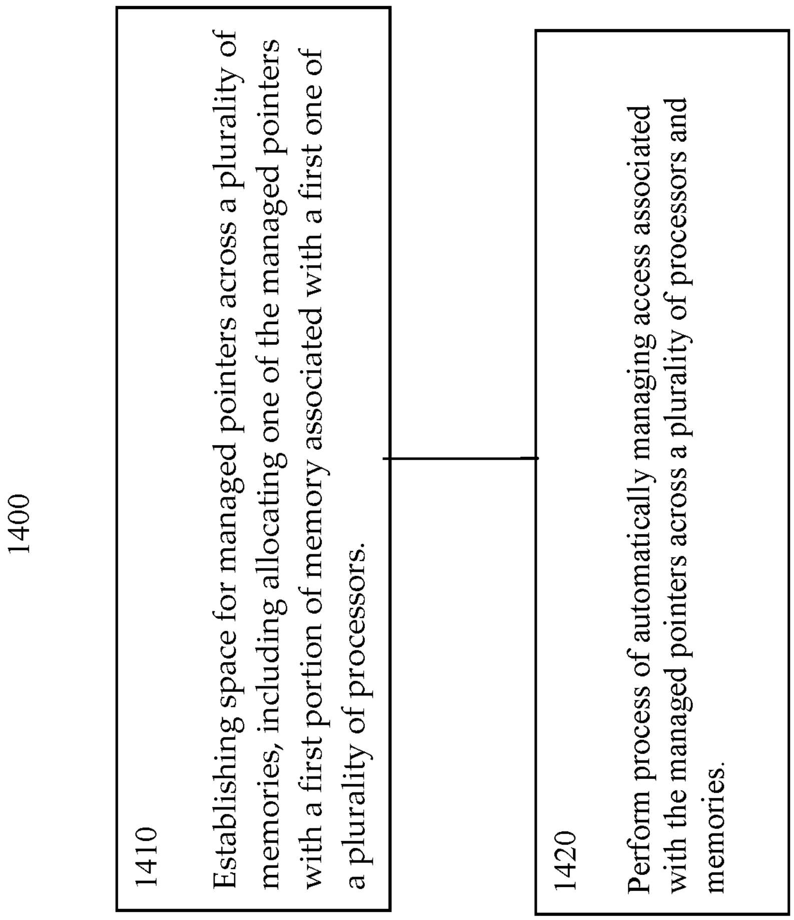
FIG. 1 is a flow chart of an exemplary automated unified memory management method in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

In one embodiment, an automatically managed unified memory allows an application to use a single pointer to access data associated with the pointer from multiple locations. The "managed" pointer can be accessed or used across multiple different entities (e.g., a kernel, a processor, CPU, GPU, etc.). The single pointer can be associated with automatically managed memory. In one exemplary implementation, managed refers to a memory space that is automatically managed by a driver (e.g., graphics device driver, etc.). In one embodiment, an automatically managed unified memory differs from a conventional unified memory by allowing virtual address spaces associated with different entities (e.g., different processors, GPU, CPU, etc.) to be treated as if it is one memory space. Treating multiple memories as single memory space relieves a user from having to explicitly direct many of the multiple memory management activities. In one exemplary implementation, a unified set of page tables is not necessarily used and there can actually be multiple different sets of page tables. In one embodiment, memory space associated with a pointer is reserved and accesses by multiple entities to the pointer are automatically managed.

In one embodiment, an automatically managed unified memory creates a management memory space to be used in unified memory. In one exemplary implementation, management memory space is created by allocating unified memory space as managed memory. At times the management memory space can automatically be made local enabling "local" access to associated data. For example, the managed address space can be in memory associated with a host (e.g., CPU) or memory associated with a device (e.g., GPU). Having data be present locally typically increases the performance of those accesses, as opposed to using remote memory access (e.g., over PCI, etc.). The automated management of the memory spaces enables the system to take care of putting the data where it is necessary or appropriate based on accesses. In one embodiment, a page fault handler manages migration of pages belonging to the managed memory allocations, migrating them back and forth between CPU memory and GPU memory. Consistency is also automatically maintained across multiple memories (e.g., latest concurrence, etc.). Normally the address range representing an allocation for managed memory is not mapped in the CPU's virtual address space. In one exemplary implementation, upon CPU access of unified memory data, the page fault handler copies the appropriate page from GPU memory to CPU memory and maps it into the CPU's virtual address space, allowing the CPU to access the data.

The managing can include various activities. In one exemplary implementation, when a GPU is accessing a pointer the automated management makes sure the appropriate consistent information or data associated with the pointer is put on or moved to the GPU, and when the CPU is accessing the pointer the automated management makes sure the appropriate consistent information or data associated with the pointer is put on or moved to the CPU. The movement or copying of information between the processors can be automated and transparent to the user by utilizing the single "managed" pointer. In one embodiment, a user or programmer can utilize the single managed pointer without having to be concerned about the concurrency or coherency of data between the different processors or memories (e.g., CPU, GPU, etc.). Thus, the automatic managed memory approach can enable a CPU access to GPU data. CPU page faults to the same location or single pointer in the unified memory can also be automatically handled, even though there may be two distinct or discrete physical memories (e.g., the CPU and the GPU, etc.).

FIG. 1 is a flow chart of an exemplary automated unified memory management method in accordance with one embodiment of the present invention.

In block 1410, space for managed pointers is established across a plurality of memories. In one embodiment, one of the managed pointers is allocated to a first portion of memory associated with a first one of a plurality of processors. In one embodiment, the managed memory is part of a unified memory. In one exemplary implementation, establishing a managed memory includes a processor reserving one or more regions from the processors' virtual address space. In one exemplary implementation, a GPU physical address (GPU PA) can be mapped to an allocated central processing address (CPU VA).

In block 1420, accesses associated with the single pointer are automatically managed across a plurality of processors and memories. In one embodiment, the automatic management includes ensuring consistent information associated with the managed pointers is copied from the first portion of memory to a second portion of memory associated with a second one of the plurality of processors based upon initiation of an accesses to the managed pointers from the second one of the plurality of processors. In one exemplary implementation, when a CPU attempts to access the pointer, physical space in the CPU PA is allocated, the portion of the GPU PA is automatically copied to the CPU PA, and the address in the CPU VA is mapped to the newly allocated CPU physical memory.

In one embodiment, a novel API managed memory allocation call triggers an automated unified memory management method. The API managed memory allocation call can instruct a driver (e.g., GPU driver, etc.) to automatically manage the memory. In one exemplary implementation, the novel API call includes a GPU cudaMallocManaged call. In one embodiment, a cudaMallocManaged call returns pointers within a reserved VA range associated with managed memory. Reserving a certain VA range for use by a pointer in multiple VA spaces ensures the pointer can be used in multiple VA spaces (e.g., CPU and GPU memory spaces, etc.). FIGS. 2 through 5 are block diagrams of exemplary memory spaces associated with an automated unified memory management process in accordance with one embodiment.

Figure 2:
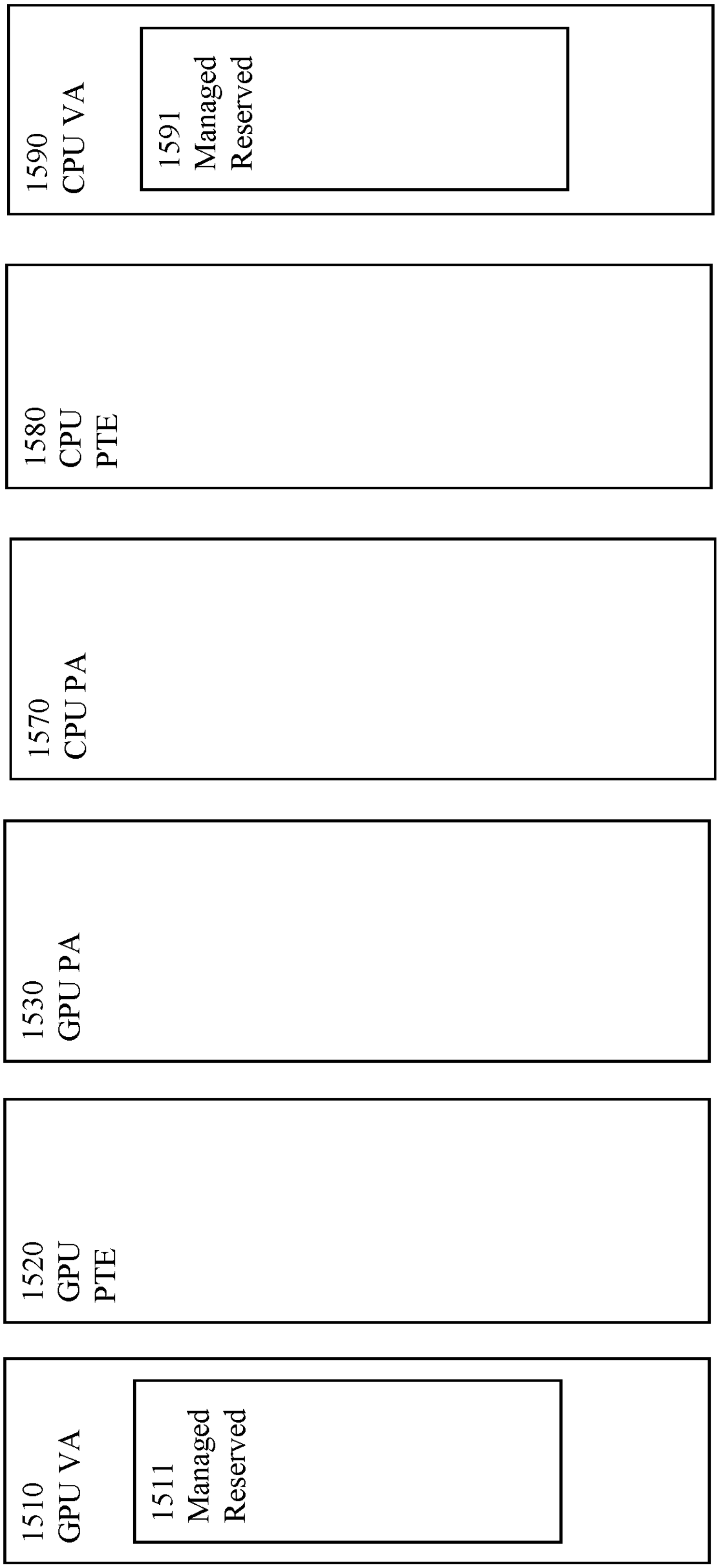
FIG. 2 is a block diagram of exemplary memory space reservation in accordance with one embodiment.

In one embodiment, regions from a GPU's virtual address space are reserved and a similar set of regions are also reserved in a CPUs virtual address space. FIG. 2 is a block diagram of exemplary memory space reservation n accordance with one embodiment. Managed memory chunks or addresses 1511 in GPU VA 1510 and corresponding managed memory chunks or addresses 1591 in CPU VA 1590 are reserved. In one embodiment, the reserved managed memory chunks or addresses 1511 and 1591 are the same size. A pointer managed by a particular driver can be used and accessed by multiple processors because accesses to the reserved managed memory space by other "non-managed" pointers (e.g., pointers not managed by the particular device) is prevented. In one exemplary implementation, if code includes an allocation call associated with a non-managed pointer, (e.g., if GPU code calls cudaMalloc, if CPU code calls Malloc, etc.) the system will use or allocate a part of the VA space that has not been reserved for managed pointer memory (e.g., an address outside the reserved range is returned for allocation to the "non-managed" pointer, etc.).

The reservation can be initiated by a GPU driver. The driver provides an opt-in allocator to the application to allocate out of these regions. In one embodiment, when initializing a CUDA driver the processor examines how much memory is in the system between the CPU and GPUs and a large enough total of managed memory is reserved. In one exemplary implementation, a matching range is reserved in the VA space of multiple GPUs.

In one embodiment, the reserved VA ranges do not initially map to any physical memory. Normally, the address range representing an allocation is not initially mapped in the GPU's or CPU's virtual address space. The physical pages backing the VA allocations are created or mapped in GPU and CPU memory.

Figure 3:
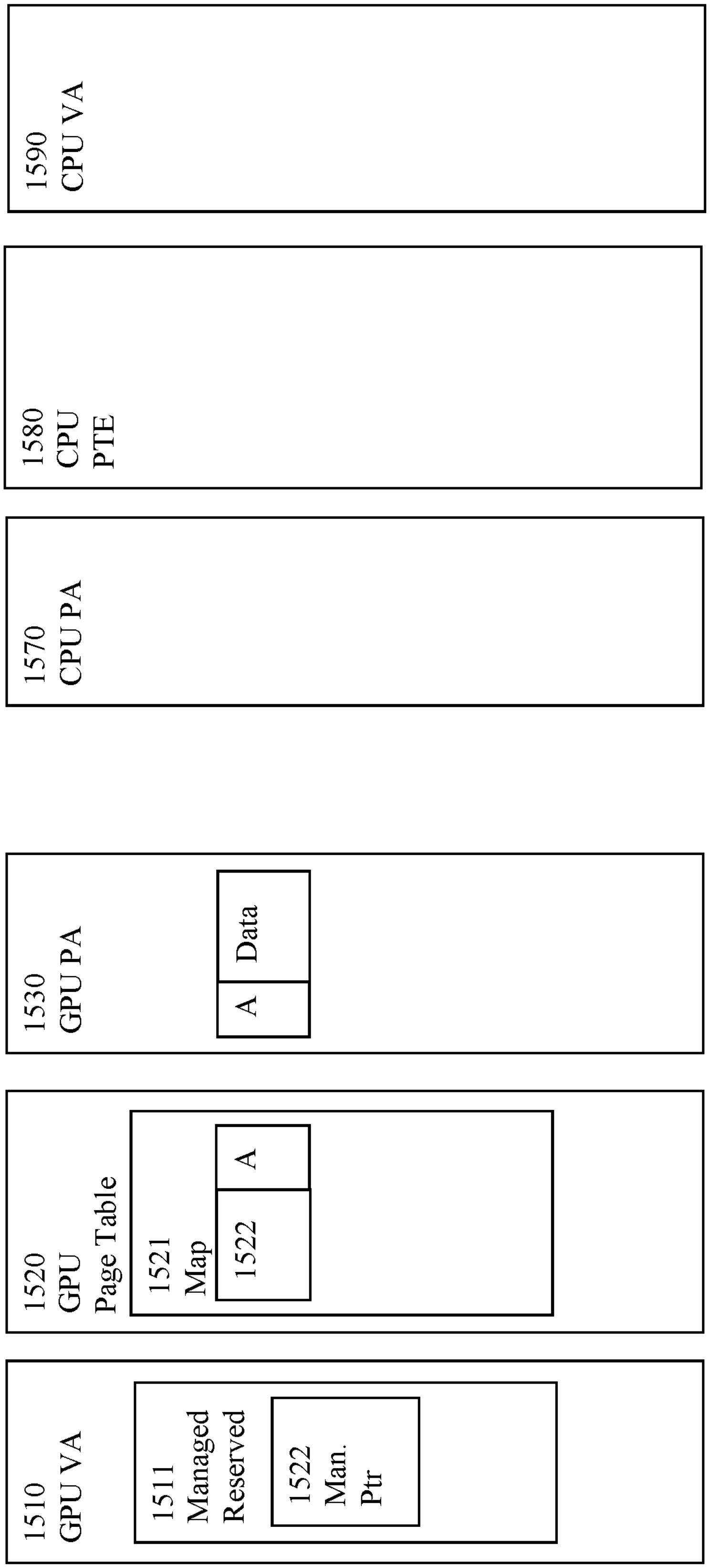
FIG. 3 is a block diagram of exemplary memory spaces associated with an API managed pointer memory allocation call in accordance with one embodiment.

FIG. 3 is a block diagram of exemplary memory spaces associated with an API managed pointer memory allocation call in accordance with one embodiment. In one embodiment, when an API managed pointer memory allocation call is encountered, addresses or locations within the reserved VA range are returned and a chunk 1522 from the reserved range 1511 in the GPU VA space 1510 is allocated to the managed pointer Ptr. Pages or addresses "A" from the GPU PA 1530 are allocated and mapped to GPU VA 1522 in GPU page table 1520 map entry 1521. A GPU kernel mode driver is also notified of the new managed allocation. Now the GPU side mapping is set up and a GPU kernel which accesses the allocation can use the physical memory mapped under it.

Figure 4:
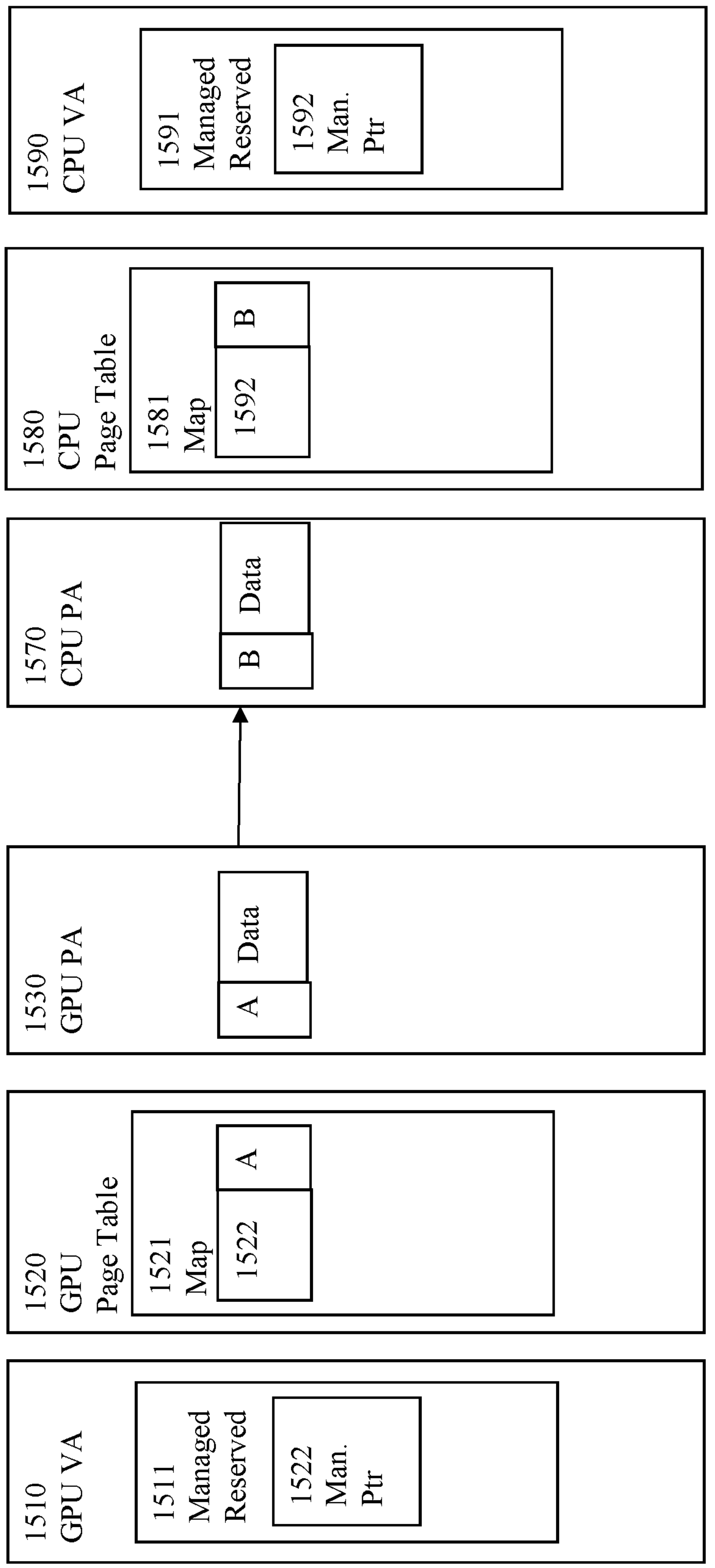
FIG. 4 is a block diagram of exemplary memory spaces associated with an access call from a different entity in accordance with one embodiment.

FIG. 4 is a block diagram of exemplary memory spaces associated with an access call from a different entity in accordance with one embodiment. When there is an access to the same pointer Ptr from the CPU, initially there is not a CPU virtual address that maps to the pointer and a page fault is triggered. The kernel mode driver which was previously notified of the allocation handles the page fault. A physical page or address "B" is allocated from the CPU PA 1570. The driver copies the data contents of the corresponding GPU physical page or address "A" into the CPU physical page or address "B". The CPU virtual page or address 1592 is mapped to the physical page "B" by the mapping 1581 in the CPU page table 1580. Control returns to the user code on the CPU which triggered the fault. The virtual address 1592 is now valid, and the access which faulted is retried and operations are directed to the CPU physical memory page or address "B".

If a later access from the CPU code happens to be in the same page, there is no fault because the page has already been paged in and it will be a relatively fast access. But if a later access crosses a page boundary, a new fault occurs. If a fault occurs within the reserved VA range but the address requested is not inside any allocation the kernel mode driver has been notified about, the fault is not handled and the user process receives a signal for the invalid access.

Figure 5:
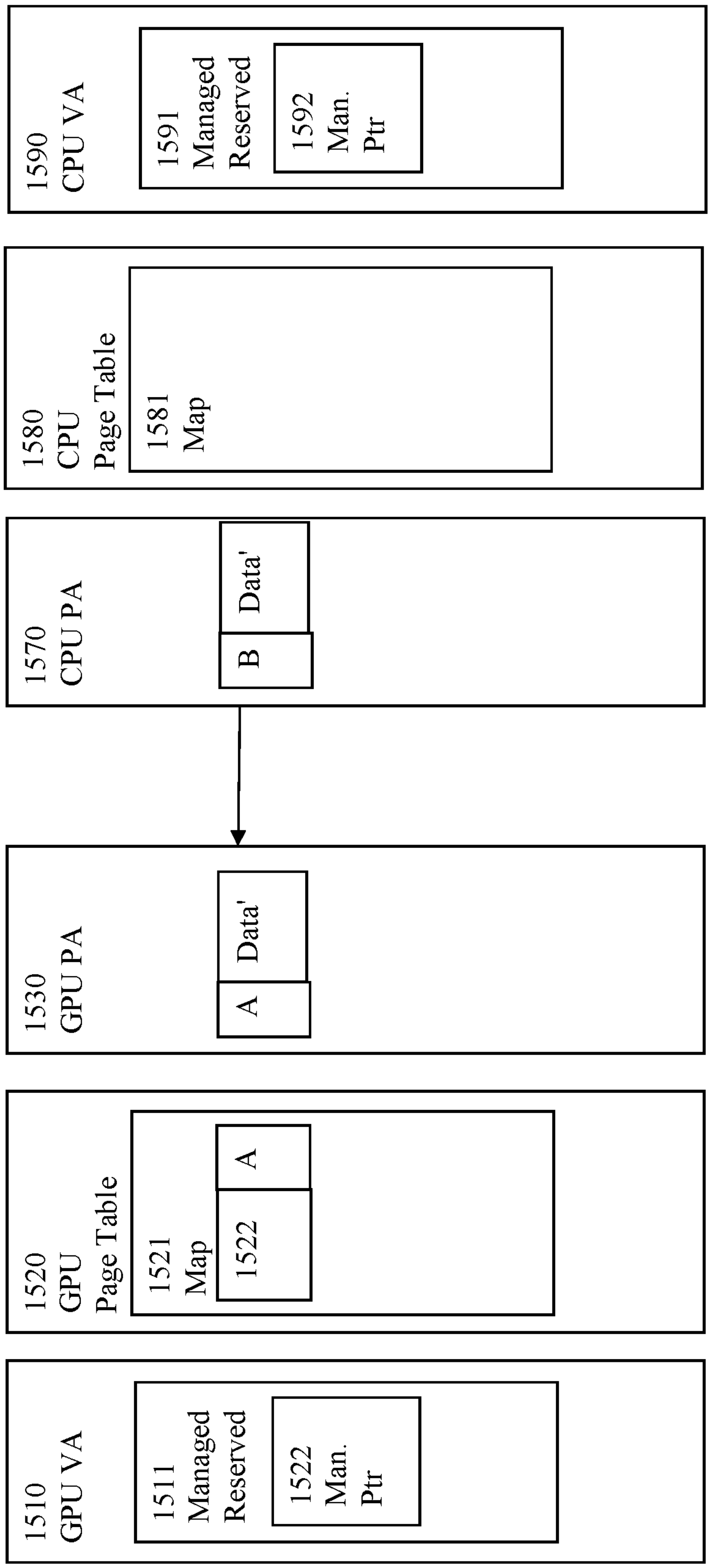
FIG. 5 is a block diagram of exemplary memory space associated with a launch in accordance with one embodiment.

FIG. 5 is a block diagram of exemplary memory space associated with a launch in accordance with one embodiment. When work is launched on the GPU, any pages that were migrated to CPU memory are flushed back to GPU memory, and the CPU's virtual address mappings may be unmapped. In one exemplary implementation, data' is flushed back from CPU PA 1570 to GPU PA 1530 and the 1592 previously mapped to B in map 1581 (shown in FIG. 4) is unmapped (in FIG. 5). Data' may be the same as the data copied or moved to the CPU in FIG. 4 or data' may be the result of modification of the data by the CPU. After this point, the CPU needs to synchronize on the pending GPU work before it can access the same data from the CPU again. Otherwise the application could be accessing the same data from both the CPU and the GPU, violating the programming model and possibly resulting in data corruption. One way the page fault handler can prevent such coherency violations is by throwing a segmentation fault on CPU access to data that is potentially being used by the GPU. However, the programming model doesn't require this, and this is meant as a convenience to the developer to know when a concurrency violation occurred. There are other ways in which coherency violations can be prevented that may be part of the driver implementation.

The following is one exemplary utilization of two pointers and an explicit copy instruction:

```
global__ k(int *ptr){ //use ptr
}
void ( ){
   int *d_ptr, *h_ptr;
   size_t size=100;
   cudaMalloc (& d_ptr,
   size); k<<<1,1>>>(d_ptr);
   h_ptr=malloc(size);
   cudaMemcpy (h_ptr, d_ptr, size);
   //verify h_ptr on CPU
   printf("%d\n", h_ptr[0]); }
```

In one embodiment of a single pointer approach, the need for h_pointer is eliminated. In one exemplary implementation, memory otherwise associated with the h_pointer can be freed up for other use as compared to when the h-pointer is included. The need for including a specific copy instruction (e.g., cudaMemcpy call, etc.) in the code to copy data from host to device or device to host is eliminated, saving processing resources and time. The system automatically takes care of actually copying the data. The automated copying can offer subtle benefits. In the past, even if only part of a range needed to be copied, the conventional approaches copied the whole range (e.g., with an unconditional cudaMemcpy call, etc.). In contrast, in one embodiment of a single pointer automated managed memory approach the copy is done based on accesses. In one exemplary implementation, when the CPU accesses a pointer there is actually a page fault handler (e.g., as part of a kernel mode driver, etc.) and the ranges have already been resolved (e.g., with the kernel mode driver, etc.). It sees that the access is directed to a particular managed page and copies the data being accessed without excess data. In one embodiment, it knows exactly what to copy. It can copy at a smaller granularity based on access (e.g., copies a limited or smaller amount of data associated with an access as opposed conventional approaches that copy a larger amount such as a whole allocation or array, etc.).

There are a variety of ways to create or allocate managed memory. One way is through an API call. Another way is an added keyword managed that can be applied to device variables. It can be part of the language itself. Prior to the novel managed API, users could only declare device variables here. In one embodiment, a device variable has the same restrictions as an allocation returned by cudaMalloc. So a device variable cannot be accessed from the CPU. A user wishing to access the data from the CPU can use a special API such as cudaMemcpy to copy from the GPU memory to a separate CPU memory location. The managed memory space allows use of the keyword managed that can be applied to device variables. For example, one can directly reference a managed device variable in the CPU code without having to worry about copy operations, which are now done automatically for the user. Using managed memory, a user does not have to track or worry as much about coherence and copies between the two different pointers.

The following is one exemplary utilization of a single unified pointer:

```
global__ k
(int*ptr) {
//use ptr
}
void main( ) {
   int *ptr;
   size_t size =100;
   cudaMallocManaged (&tptr, size);
   k<<<1,1>>>(ptr);
   cudaDeviceSynchronize ( );
   printf ("%d\n", ptr[0]);
}
```

Alternatively, the above code can use a qualified variable rather than a dynamic allocation:

```
__device__ __managed__ int foo[100];
   global__ k ( ){ //use foo
}
void main( ) {
      k<<<1,1>>>( );
      cudaDeviceSynchronize ( );
      printf ("%d\n", foo[0]);
}
```

The described approach significantly reduces the barrier to entry for novice users. It also makes porting of code and the use of GPUs easier.

In one embodiment, on a CPU access the CPU access actually copies data over from the GPU. CPU code may then modify the contents of this memory in the CPU physical copy. When doing a kernel launch, the kernel mode driver is first notified that a kernel launch is being performed. The driver examines information about managed memory that has been copied to the CPU physical memory, and copies the contents of certain CPU physical memory back to the GPU physical memory. Then the kernel is launched and the kernel can use the data because it is up to date. In one exemplary implementation, during the kernel launch is when there is a copy back to the GPU and the GPU can use it.

In one embodiment, a cudaDeviceSynchronize call is performed. The cudaDeviceSynchronize can be called before accessing data from the CPU again. If a synchronize call is not made the data may not be coherent and this can cause data corruption. In one exemplary implementation, the data programming model does not allow concurrent access to the data by both the GPU and CPU at the same time and that is why a cudaDeviceSynchronize is included, ensuring work on the GPU which may be accessing the data has completed. In one exemplary implementation, kernel launches are asynchronous and the only way to know a kernel has completed is by making a synchronize call.

There are various ways to synchronize. A device synchronize can be performed which means synchronize the work launched on the device or GPU. A subset of GPU work can also be synchronized such as a CUDA stream.

Additional explanation of CUDA stream approaches is set forth in later portions of the detailed description. The synchronize is performed before the data can be accessed from the CPU again. If the synchronize is not performed and an attempt to access a managed region from the CPU is made, the page fault handler is aware of the outstanding GPU work and the user process is signaled rather than handle the page fault, as the user code has violated the requirements of the programming model. It is appreciated that disallowing concurrent access is not the only approach to provide coherence.

Another way to provide coherence is utilizing page merging. In one embodiment, a kernel is running and using the data actively when there is an access to the managed data on the CPU. It will create a backup copy of the page contents at the time of the access, and then set up mappings to separate physical copies in both locations so the CPU and GPU code can continue and access the data concurrently. A three-way merge of the three copies is later performed and a new page that contains the merged data from the three pages is created. In one exemplary implementation, page merging is used and segmentation faults are not issued for concurrent access.

Figure 6:
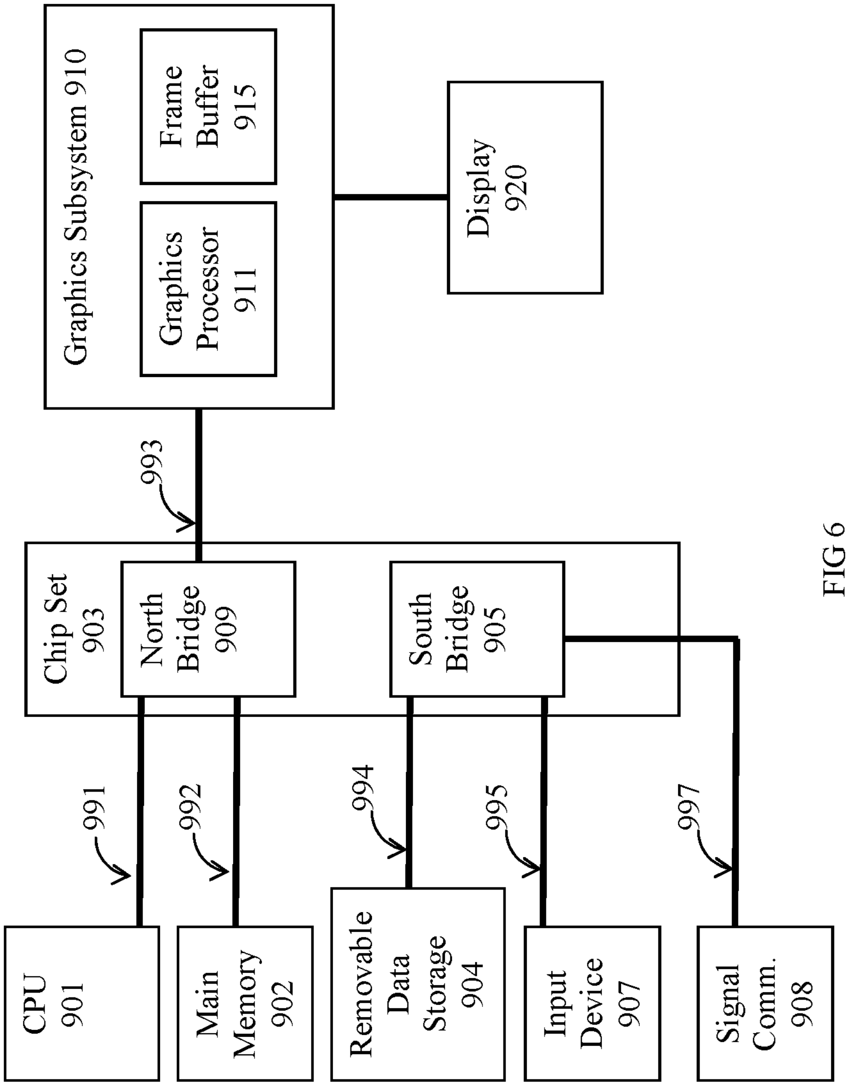
FIG. 6 is a block diagram of an exemplary computer system, one embodiment of a computer system upon which embodiments of the present invention can be implemented.

With reference to FIG. 6, a block diagram of an exemplary computer system 900 is shown, one embodiment of a computer system upon which embodiments of the present invention can be implemented. Computer system 900 includes central processor unit 901, main memory 902 (e.g., random access memory), chip set 903 with north bridge 909 and south bridge 905, removable data storage device 904, input device 907, signal communications port 908, and graphics subsystem 910 which is coupled to display 920. Computer system 900 includes several busses for communicatively coupling the components of computer system 900. Communication bus 991 (e.g., a front side bus) couples north bridge 909 of chipset 903 to central processor unit 901. Communication bus 992 (e.g., a main memory bus) couples north bridge 909 of chipset 903 to main memory 902. Communication bus 993 (e.g., the Advanced Graphics Port interface) couples north bridge of chipset 903 to graphic subsystem 910. Communication buses 994, 995 and 997 (e.g., a PCI bus) couple south bridge 905 of chip set 903 to removable data storage device 904, input device 907, signal communications port 908 respectively. Graphics subsystem 910 includes graphics processor 911 and frame buffer 915.

The components of computer system 900 cooperatively operate to provide versatile functionality and performance. In one exemplary implementation, the components of computer system 900 cooperatively operate to provide predetermined types of functionality. Communications bus 991, 992, 993, 994, 995, and 997 communicate information. Central processor 901 processes information. Main memory 902 stores information and instructions for the central processor 901. Removable data storage device 904 also stores information and instructions (e.g., functioning as a large information reservoir). Input device 907 provides a mechanism for inputting information and/or for pointing to or highlighting information on display 920. Signal communication port 908 provides a communication interface to exterior devices (e.g., an interface with a network). Display device 920 displays information in accordance with data stored in frame buffer 915. Graphics processor 911 processes graphics commands from central processor 901 and provides the resulting data to video buffers 915 for storage and retrieval by display monitor 920.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the following is a listing of exemplary concepts or embodiments associated with the novel approach. It is also appreciated that the listing is not exhaustive and does not necessarily include all possible implementation. The following concepts and embodiments can be implemented in hardware. In one embodiment, the following methods or process describe operations performed by various processing components or units. In one exemplary implementation, instructions or directions associated with the methods, processes, operations etc. can be stored in a memory and cause a processor to implement the operations, functions, actions, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

The invention claimed is:

1. One or more processors, comprising:

processing circuitry to, in response to an attempt to access a pointer to data by a first processing entity, cause the data to be copied from a memory location of a second processing entity to a memory location of the first processing entity.

2. The one or more processors of claim 1, wherein the processing circuitry is to launch a kernel to cause the data to be copied from the memory location of the second processing entity to the memory location of the first processing entity.

3. The one or more processors of claim 1, wherein the first processing entity is a kernel and the second processing entity is central processing unit (CPU).

4. The one or more processors of claim 1, the processing circuitry is further to, in response to the attempt to access the pointer, enable a kernel mode that supports copying of the data from the memory location of the second processing entity to the memory location of the first processing entity.

5. The one or more processors of claim 1, wherein the processing circuitry is further to:

map virtual address spaces with physical memories of the first processing entity and of the second processing entity;

enable the virtual address spaces as the memory location of the first processing entity and the memory location of the second processing entity;

cause an operation to be launched on the second processing entity;

flush at least a page that was migrated to the first processing entity back to the second processing entity; and un-map one or more of the virtual address spaces mapped to the first processing entity.

6. The one or more processors of claim 1, wherein the pointer is a managed pointer in a reserved virtual address space of the second processing entity.

7. The one or more processors of claim 1, wherein the first processing entity is central processing unit (CPU) and the second processing entity is a graphics processing unit (GPU).

8. The one or more processors of claim 1, wherein the processing circuitry is further to:

receive a request to perform an operation using altered data in the memory location of the second processing entity; and copy the altered data from the memory location of the second processing entity to the memory location of the first processing entity in response to the request.

9. A method comprising:

allocating a pointer to a memory location comprising data;

attempting access to the pointer using a first processing unit; and copying the data from the memory location to a memory location of the first processing unit in response to the attempted access to the pointer.

10. The method of claim 9, wherein the memory location comprising the data is associated with a second processing unit.

11. The method of claim 10, wherein the first processing unit is central processing unit (CPU) and the second processing unit is a graphics processing unit (GPU).

12. The method of claim 9, wherein copying the data from the memory location to a memory location of the first processing unit in response to the attempted access to the pointer comprises calling, by the first processing unit, an application programming interface (API).

13. The method of claim 9, wherein the pointer is a managed pointer in a reserved virtual address space of a second processing unit.

14. A system, comprising:

a first processing entity;

a second processing entity; and a non-transitory computer-readable medium storing instructions executable by at least one of the first processing entity and the second processing entity to:

in response to an attempt to access a pointer to data by the first processing entity, cause the data to be copied from a memory location of the second processing entity to a memory location of the first processing entity.

15. The system of claim 14, wherein the first processing entity is a kernel and the second processing entity is central processing unit (CPU).

16. The system of claim 14, wherein the instructions executable by the at least one of the first processing entity and the second processing entity are further to enable a kernel mode that supports copying of the data from the memory location of the second processing entity to the memory location of the first processing entity.

17. The system of claim 14, wherein the instructions executable by the at least one of the first processing entity and the second processing entity are further to launch a kernel to cause the data to be copied from the memory location of the second processing entity to the memory location of the first processing entity.

18. The system of claim 14, wherein the pointer is a managed pointer in a reserved virtual address space of the second processing entity.

19. The system of claim 14, wherein the first processing entity is central processing unit (CPU) and the second processing entity is a graphics processing unit (GPU).

20. The system of claim 14, wherein the instructions executable by the at least one of the first processing entity and the second processing entity are further to:

map virtual address spaces with physical memories of the first processing entity and of the second processing entity;

enable the virtual address spaces as the memory location of the first processing entity and the memory location of the second processing entity;

cause an operation to be launched on the second processing entity;

flush at least a page that was migrated to the first processing entity back to the second processing entity; and un-map one or more of the virtual address spaces mapped to the first processing entity.

* * * * *